(12) United States Patent
Goetze et al.

(10) Patent No.: US 9,976,408 B2
(45) Date of Patent: May 22, 2018

(54) NAVIGATION DEVICE AND METHOD FOR SURVEYING AND DIRECTING A BOREHOLE UNDER DRILLING CONDITIONS

(71) Applicant: Imdex Global B.V., Amsterdam, Zuidoost (NL)

(72) Inventors: Dieter Goetze, Emmendingen (DE); Steve Toghill, Au (DE)

(73) Assignee: ImDex Global B.V., Amsterdam (NL)

(*) Notice: Subject to any disclaimer, the term of this patent is extended or adjusted under 35 U.S.C. 154(b) by 701 days.

(21) Appl. No.: 14/370,521

(22) PCT Filed: Dec. 21, 2012

(86) PCT No.: PCT/AU2012/001584
§ 371 (c)(1),
(2) Date: Jul. 3, 2014

(87) PCT Pub. No.: WO2013/102237
PCT Pub. Date: Jul. 11, 2013

(65) Prior Publication Data
US 2014/0366622 A1    Dec. 18, 2014

(30) Foreign Application Priority Data
Jan. 4, 2012 (AU) .................................. 2012900031

(51) Int. Cl.
*E21B 47/02* (2006.01)
*E21B 47/022* (2012.01)
(Continued)

(52) U.S. Cl.
CPC ............ *E21B 47/02* (2013.01); *E21B 47/022* (2013.01); *E21B 47/09* (2013.01); *G01C 19/02* (2013.01); *E21B 47/02232* (2013.01)

(58) Field of Classification Search
CPC ... E21B 47/02; E21B 47/022; E21B 47/02232
See application file for complete search history.

(56) References Cited

U.S. PATENT DOCUMENTS 4,812,977 A    3/1989    Hulsing, II
5,806,195 A    9/1998    Uttecht et al.
(Continued)

OTHER PUBLICATIONS

International Search Report for corresponding International Patent Application No. PCT/AU2012/001584 dated Mar. 19, 2013, 6 pages.

(Continued)

*Primary Examiner* — David J Bagnell
*Assistant Examiner* — Tara E Schimpf
(74) *Attorney, Agent, or Firm* — Merchant & Gould P.C.

(57) ABSTRACT

A navigation device for surveying and directing a borehole comprises: a first gyro including a first sensitive axis and a second sensitive axis; a second gyro including at least a third sensitive axis; and a driving unit configured to orient the second gyro in a first mode in a first position in which an earth acceleration dependent error on the second gyro is insignificant and to orient the second gyro in a second mode in a second position in which the third sensitive axis is perpendicular to the first sensitive axis and perpendicular to the second sensitive axis.

12 Claims, 4 Drawing Sheets

(51) Int. Cl.
*E21B 47/09* (2012.01)
*G01C 19/02* (2006.01)

(56) References Cited

U.S. PATENT DOCUMENTS

| | | | | |
|---|---|---|---|---|
| 5,821,414 A * | 10/1998 | Noy | ...................... | E21B 47/022 33/304 |
| 6,714,870 B1 * | 3/2004 | Weston | .................. | E21B 47/022 702/6 |
| 2002/0133958 A1 | 9/2002 | Noureldin et al. | | |
| 2005/0224257 A1 * | 10/2005 | Ekseth | .................. | E21B 47/022 175/45 |
| 2009/0119937 A1 | 5/2009 | Watson et al. | | |
| 2009/0287451 A1 | 11/2009 | Sato et al. | | |
| 2010/0198518 A1 * | 8/2010 | Ekseth | .................. | E21B 47/022 702/6 |

OTHER PUBLICATIONS

Extended European Search Report for EP Application No. 12864519 dated Dec. 14, 2015 (6 pages).

* cited by examiner

NAVIGATION DEVICE AND METHOD FOR SURVEYING AND DIRECTING A BOREHOLE UNDER DRILLING CONDITIONS

This application is a National Stage Application of PCT/AU2012/001584, filed 21 Dec. 2012, which claims benefit of Serial No. 2012900031, filed 4 Jan. 2012 in Australia and which applications are incorporated herein by reference, To the extent appropriate, a claim of priority is made to each of the above disclosed applications.

FIELD OF THE INVENTION

The invention relates to a navigation device for surveying and directing a borehole and a corresponding method under drilling conditions.

BACKGROUND ART

The following discussion of the background art is intended to facilitate an understanding of the present invention only. The discussion is not an acknowledgement or admission that any of the material referred to is or was part of the common general knowledge as at the priority date of the application.

When drilling a borehole in order to search for oil or gas resources or in order to use the borehole for underground connection purposes, it is considered essential to accurately monitor and steer the direction of a drill bit such that the borehole is created where desired.

Prior Art U.S. Pat. No. 4,812,977 establishes the method and apparatus of using a strapdown Inertial Navigation System (INS) to map a borehole. The measurement of measured depth independently via a wireline encoder unit is used to restrict the growth of time dependent errors, such as accelerometer and gyroscope drifts. "Strapdown" in this case, means that the sensors are physically and rigidly mounted on the body of the probe, and have no physical isolation from the probes angular rotations and linear accelerations.

One clear disadvantage of this "Strapdown Inertial Navigation" apparatus is that the use of the probe is limited to the dynamic range of the sensors. In gyroscopes, this is typically around 200 degrees/second. During certain drilling operations, angular rotations mainly around the tool long axis (roll axis) can exceed these rates, resulting in Gyroscope saturation and a corresponding loss of the calculated navigation attitude. The survey is then either degraded, or rendered completely invalid.

U.S. Pat. No. 6,714,870 provides a solution to this, whereby the roll axis of the navigation instruments (platform) is decoupled from the probe by use of a mechanical drive unit. The mechanical "platform" is counter-rotated to hold the platform fixed in inertial space, and hence sees much reduced angular rates around the tool long axis. This extends the use of the INS technology to applications where high roll rates can be expected, namely during rotation of the drill-string Gyro MWD (Gyro—Measure While Drilling).

One critical requirement of any wellbore directional system is to be able to find the azimuth of the probe, or when in vertical or near vertical position, to find the azimuth of the "High-Side zero position", which is termed "Gyro Toolface" or "GTF".

For further discussion, since this invention can apply to a multitude of sensors, it is important to define the term "Sensitive Axes". Concerning a "Dynamically Tuned Gyro" or "DTG", there are 2 "sensitive Axes" orthogonal to each other and to the spin axes. Considering a single axis MEMS gyroscope, a single "sensitive axis" only exists. In this case if 2 "Sensitive Axes" are discussed, it would mean 2× single axis MEMS. Gyros can be used, or 1 dual axis MEMS device to produce the two "Sensitive Axes".

The ability of any gyro sensor system to find Azimuth or GTF is dependent on the sensitivity and repeatability of the sensors, since the local component of earth rate and local accelerations due to gravity provide the necessary reference information from which the tool attitude is computed. Any non-removable Bias on these sensor readings will appear as an Attitude error. Since the gyroscope has a significant "Bias" coming from manufacturing imperfections, certainly in the range of the earth-rate signal trying to be measured, it is required to eliminate this bias to an insignificant amount.

A good practical way to do this is to rotate the gyroscope physically 180 degrees, using fixed opposing positions, and to measure and compare the output rate of the Gyro in the opposing positions. This procedure for bias nulling is termed "bias nulling" or "indexing". This procedure has been described for a single Gyro in U.S. Pat. No. 5,806,195. It has however severe limitations in a non-vertical strapdown inertial application.

As the inclination of the tool is increased away from vertical, the system becomes sensitive to unmodelled g-dependent gyro bias. This is because the g-dependent bias acts on the gyroscope in the same cyclic fashion as the earth rate when the platform is rotated to remove gyro bias, and cannot be removed using the "indexing" method. This renders the above-listed invention limited for producing an INS system of the required accuracy for Gyro-MWD.

There is a need for providing a Gyroscopic based navigation device and a method for surveying and directing boreholes which can measure Azimuth (or Gyro Toolface) accurately in all inclinations, and which can provide a stable Gyro Toolface during drilling conditions of possibly high angular rotations around the drillstring, and can additionally provide a continuous INS survey between survey points.

The object is solved by a navigation device for surveying and directing boreholes and a corresponding method according to claims 1 and 9, respectively.

To facilitate this, we disclose here a system which within the narrow confines of a wellbore, can operate in 2 modes. The first mode which can bring two orthogonal "sensitive axes" in a plane orthogonal to the g-vector irrespective of any roll or inclination of the tool. This renders the measurement insensitive to the local acceleration due to gravity, and, when rotating the Gyroscope and applying an Adaptive Kalman Filter to the data, a good bias-free attitude (Azimuth & Inclination) can be reliably computed at all inclinations. The second mode brings mechanically 3 "sensitive Gyro axes" into an orthogonal configuration with respect to each other, enabling an INS platform to be formed for an INS continuous survey of the Borehole between the Gyrocompassing reference points during a survey and/or to provide a Gyro Toolface (GTF) under drilling conditions.

To enable the functionality described in the first mode above, the roll axis of the sensor array is gimballed in the roll axis. This invention allows the Gimbal to operate either as a positional mechanism as described, but also in the second mode of operation it decouples the roll motion of the tool from the sensors. This makes it exceedingly useful for G-MWD applications, where high roll rates can be expected.

SUMMARY OF THE INVENTION

It is an object of the present invention to overcome, or at least ameliorate, one or more of the deficiencies of the prior art mentioned above, or to provide the consumer with a useful or commercial choice.

Other objects and advantages of the present invention will become apparent from the following description, taken in connection with the accompanying drawings, wherein, by way of illustration and example, a preferred embodiment of the present invention is disclosed.

According to a first broad aspect of the present invention there is provided a navigation device for surveying and directing a borehole, comprising:

a first gyro including a first sensitive axis and a second sensitive axis;

a second gyro including at least a third sensitive axis; and a driving unit configured to orient the second gyro in a first mode in a first position in which an earth acceleration (g) dependent error on the second gyro is insignificant irrespective of any inclination or roll angle of the device and to orient the second gyro in a second mode in a second position in which the third sensitive axis is perpendicular to the first sensitive axis and perpendicular to the second sensitive axis.

Preferably, the second gyro includes a spinning axis and the spinning axis in the first position is oriented in parallel to the direction of earth acceleration (g).

Preferably, the second gyro is realized as a multiple single-axis micro-electromechanical system (MEMS) gyro and in the first position the third sensitive axis is oriented orthogonally to the direction of earth acceleration (g).

Preferably, the navigation device further comprises:

an outer gimbal including an outer gimbal axis;

a middle gimbal connected to the outer gimbal, wherein the middle gimbal includes a middle gimbal axis perpendicular to the outer gimbal axis;

an inner gimbal connected to the middle gimbal, wherein the inner gimbal includes an inner gimbal axis perpendicular to the middle gimbal axis;

a first sub driving unit configured to rotate the outer gimbal about the outer gimbal axis;

a second sub driving unit configured to rotate the middle gimbal about the middle gimbal axis;

a third sub driving unit configured to rotate the inner gimbal about the inner gimbal axis;

wherein the first gyro is connected to the outer gimbal and the second gyro is connected to the inner gimbal.

Preferably, the navigation device further comprises at least one acceleration sensor connected to the second gyro, wherein the at least one sensor is configured to determine the position of the second gyro in relation to the direction of earth acceleration (g).

Preferably, the at least one sensor includes three acceleration sensors which builds a triad.

Preferably, the navigation device further comprises three further acceleration sensors connected to the first gyro, which builds a triad.

According to a second broad aspect of the present invention there is provided a drilling device comprising a probe that is configured to rotate about a drill axis of the drilling device, the probe including a navigation device according to the first broad aspect of the present invention.

According to a third broad aspect of the present invention there is provided a method for surveying and directing a borehole using a navigation device comprising a first gyro including a first sensitive axis and a second sensitive axis, and a second gyro including at least a third sensitive axis, the method comprising: orienting the first gyro and the second gyro so that in a first mode the second gyro is in a first position with insignificant earth acceleration (g) dependent error irrespective of any inclination or roll angle of the device and that in a second mode the second gyro is in a second position, in which the third sensitive axis is oriented perpendicular to the first sensitive axis and the third sensitive axis is oriented perpendicular to the second sensitive axis.

Preferably, the method further comprises determining in the first mode a bias of the second gyro that is independent of the earth acceleration (g).

Preferably, the method further comprises performing an inertial navigation in the second mode.

Details of the invention will become more apparent from the following description of embodiments in connection with the accompanying drawings.

BRIEF DESCRIPTION OF THE DRAWINGS

In order that the invention may be more fully understood and put into practice, a preferred embodiment thereof will now be described with reference to the accompanying drawings, in which.

DESCRIPTION OF EMBODIMENTS

In the following, preferred embodiments of the present invention are described. It is important to note that all described preferred embodiments in the following may be combined in any way, i.e. there is no limitation that certain described preferred embodiments may not be combined with others.

Figure 1:
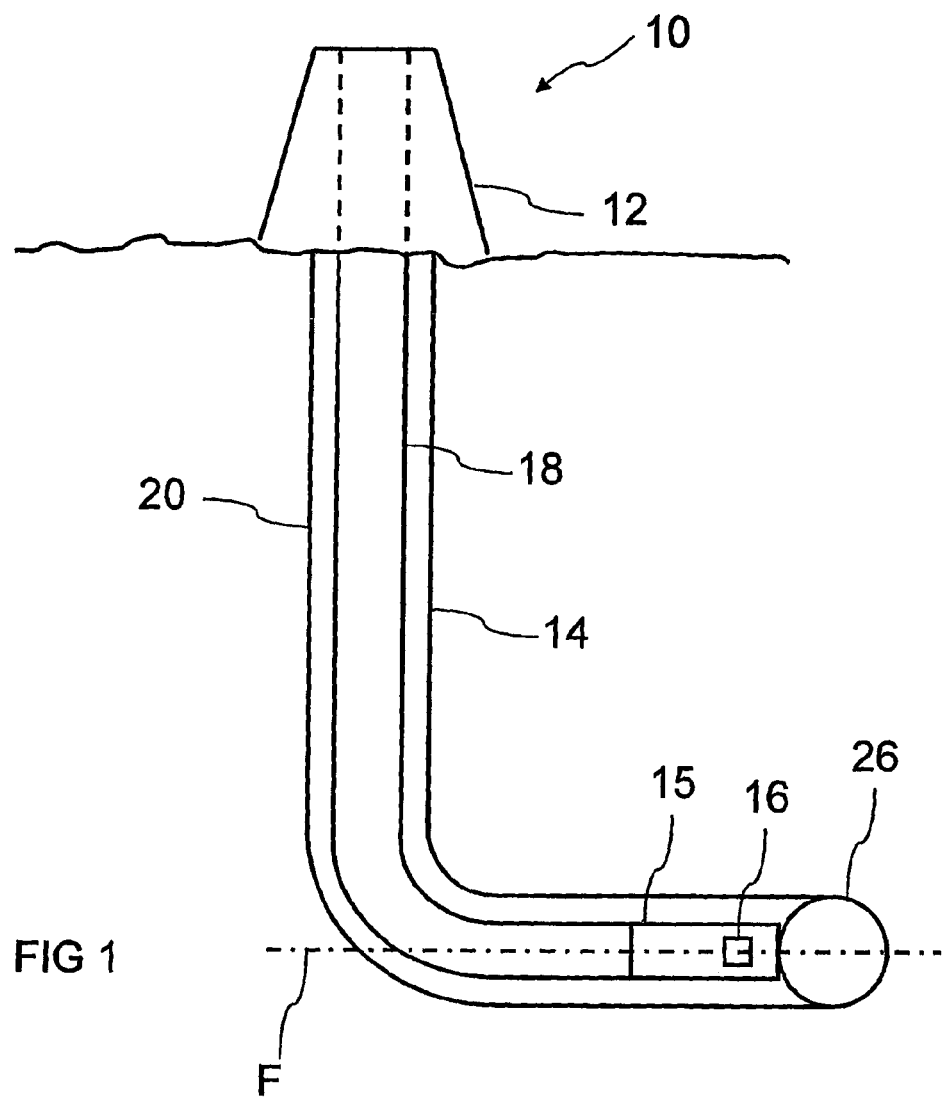
FIG. 1 is a cross-sectional schematic diagram of a drilling system that includes a navigation device in a drill pipe.

In FIG. 1 there is shown a drilling system 10 that includes drilling rig 12 in borehole 14, and a borehole mitigated probe 15, including a navigation device 16. Drilling rig 12 may be located on top of an ocean surface or on a land surface. Borehole 14 includes one or more connected drill pipes 18 that are surrounded by steel casing 20. Navigation device 16 is powered by a power supply (not depicted) and is adjacent to drill bit 26. Navigation device 16 is configured to determine the orientation and azimuth relative to north of the navigation device 16, such that it can provide the location for drill bit 26, which is located adjacent to navigation device 16.

Figure 2:
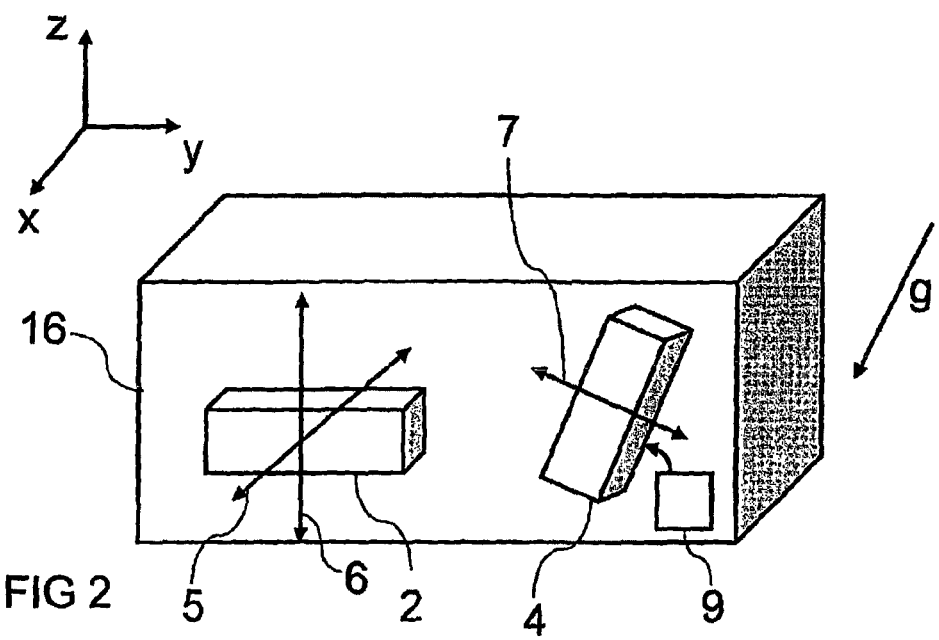
FIG. 2 is a schematic diagram of the navigation device according to a preferred embodiment of the present invention with a second gyro in first position in a first mode of operation.

A preferred embodiment of the navigation device 16 is depicted in FIG. 2 in a first mode of operation. The navigation device 16 includes a first gyro 2 including a first sensitive axis 5 and a second sensitive axis 6, a second gyro 4 including at least a third sensitive axis 7 and a driving unit 9. By way of example, in FIG. 2 the first sensitive axis 5 is oriented parallel to an x-axis of a cartesian coordinate system and the second sensitive axis 6 is oriented parallel to a z-axis of a cartesian coordinate system. It should be understood that the first sensitive axis 5 and the second sensitive axis 6 should not be oriented in parallel.

Instead of the term "sensitive axis", it might also be referred to as "input axis" or "sensing axis" of the gyro.

The driving unit 9 is configured to orient the second gyro 4 in a first mode in a first position in which an earth acceleration g dependent error on the second gyro 4 is insignificant.

When comparing measurement data from the second gyro 4 in the first position with measurement data from the second gyro 4 in any other position, it is possible to determine earth acceleration g Independent biases by e.g. a Kalman-filter, which can be used to reduce the day-to-day bias of the navigation device 16. Also the g-dependent biases can be measured in situ, making a g-sensitive bias field calibration possible. This is required primarily for the quality control (QA/QC) of a survey (can be measured before and after a survey to confirm g-sensitive biases were within limits during the survey). Also, the long term bias calibration of the product is hence improved, making factory re-calibrations less frequent.

According to a preferred embodiment the second gyro 4 might be realized as a two-axis mechanical gyro with a spinning axis. Sensitive axes of this two-axis gyro are perpendicular to the spinning axis. If the spinning axis is oriented parallel to the earth acceleration g, there is no earth acceleration g dependent error (or the error is insignificant) on measurement data output by the two-axes gyro.

When using a micro-electromechanical system (MEMS) gyro with one sensitive axis, the earth acceleration g does not have an influence on the output, when the sensitive axis is oriented perpendicular to the earth acceleration g.

Figure 3:
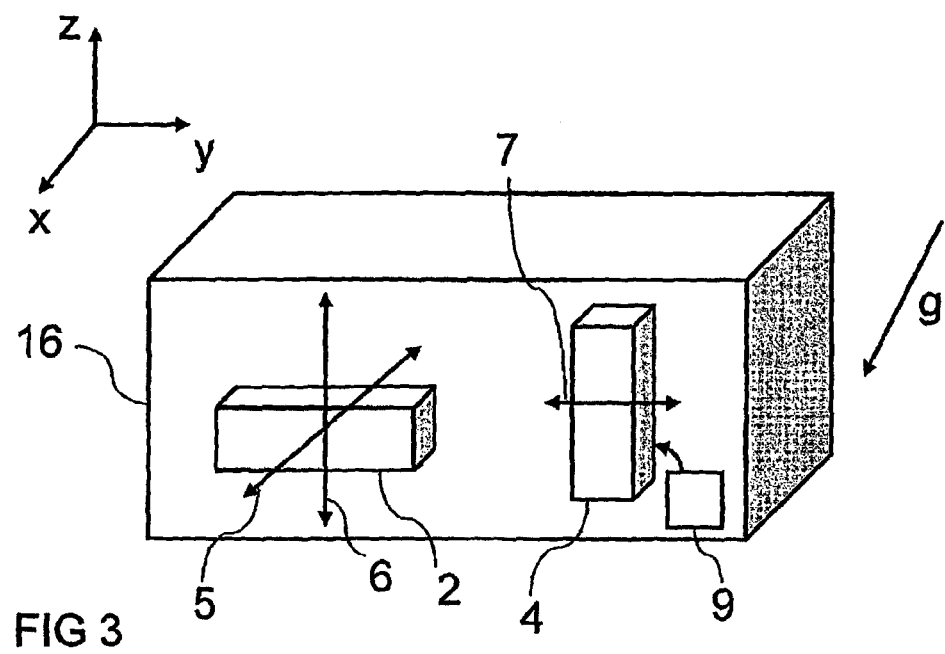
FIG. 3 is a schematic diagram of the navigation device according to a preferred embodiment of the present invention with a second gyro in a second position in a second mode of operation.

The driving unit 9 is further configured to orient the second gyro 4 in a second mode in a second position in which the third sensitive axis 7 is perpendicular to the first sensitive axis 5 and perpendicular to the second sensitive axis 6, which is depicted in FIG. 3 (where the third sensitive axis 7 is oriented parallel to the y-axis of a cartesian coordinate system). In this second position due to the perpendicular orientation of the first, second and third sensitive axes 5, 6, 7 an inertial navigation system is formed by the first gyro 2 and the second gyro 4. When using the inertial navigation system the biases determined in the first mode can be used in order to avoid gyro bias-induced errors, e.g. day-to-day bias, when navigating while drilling.

Figure 4:
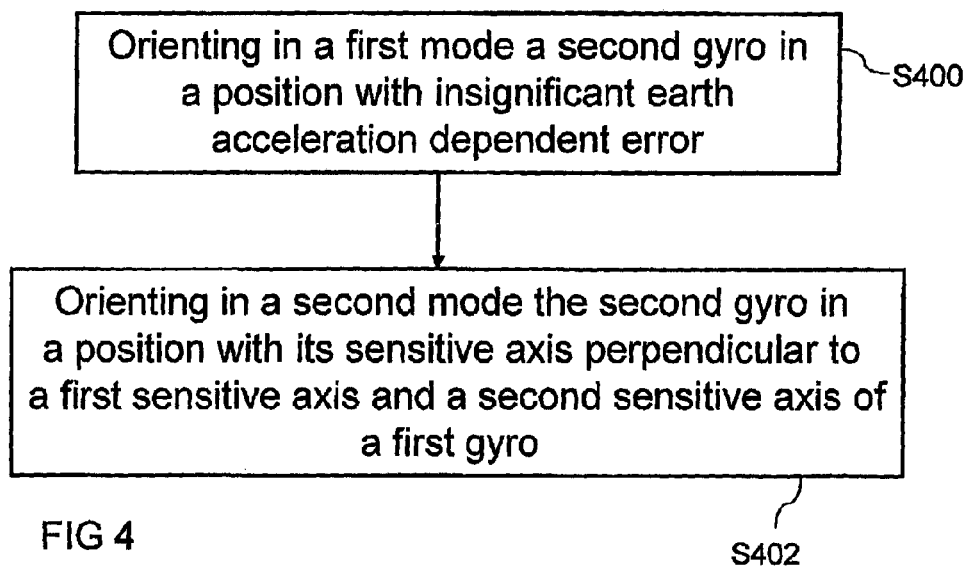
FIG. 4 is a schematic flow diagram of a method according to a preferred embodiment of the present invention.

In FIG. 4 a method according to a preferred embodiment of the present invention is schematically depicted in a flow diagram. In a step S400 a second gyro 4 including at least a third sensitive axis 7 is oriented so that in a first mode the second gyro 4 is in a first position with insignificant earth acceleration g dependent error.

In a second mode S402 the second gyro 4 is in a second position, in which the third sensitive axis 7 is oriented perpendicular to the first sensitive axis 5 and the third sensitive axis 7 is oriented perpendicular to the second sensitive axis 6.

Figure 5:
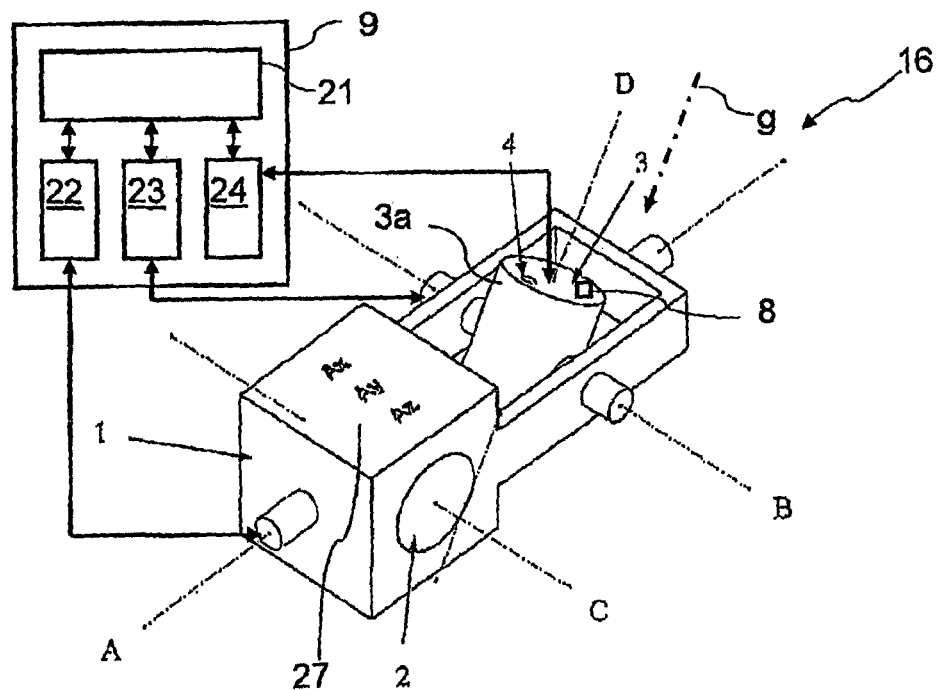
FIG. 5 is a schematic diagram of the navigation device according to a further preferred embodiment of the present invention in a first mode of operation.

In FIG. 5 a navigation device 16 according to a further preferred embodiment of the present invention is depicted. The navigation device 16 includes an outer gimbal 1, whose axis of rotation or outer gimbal axis A is along the axis F of the measuring probe 15, while drilling (cf. FIG. 1). A middle gimbal 3a, whose axis of rotation or middle gimbal axis B is perpendicular to the outer gimbal axis A is connected to the outer gimbal 1. An inner gimbal 3 is connected to the middle gimbal 3a. The axis of rotation or inner gimbal axis D of the inner gimbal 3 is perpendicular to middle gimbal axis B. At least one first gyro 2 is mounted on the outer gimbal 1 with its spin axis C perpendicular to the outer gimbal axis A. The first sensitive axis of the at least one first gyro 2 is perpendicular to the outer gimbal axis A and the second sensitive axis of the at least one first gyro 2 is perpendicular to the middle gimbal axis B.

A multitude of MEMS second gyros or one multi-axis second gyro 4 is mounted on the inner gimbal 3. The spin axis of the second gyro 4 is parallel to the inner gimbal axis D of the inner gimbal 3. Sensitive axes of the second gyro 4 are perpendicular to the spin axis.

At least two acceleration sensors 8 (only one acceleration sensor 8 is depicted in FIG. 5) with their sensing axes perpendicular to the inner gimbal axis D are mounted on the inner gimbal 3. It is also possible to provide three acceleration sensors 8, which build a triad.

In the first mode, axis D can be aligned parallel to "g" at any inclination or at any roll angle of the tool. By then rotating the Gyro around axis D (the spin axis for a 2-axis mechanical Gyro) the Gyro biases on each sensitive axis can be established using various methods, including the use of an estimating filter (such as the Kalman Filter).

With a 2-axis mechanical Gyro, or 2 single axis MEMS Gyros, the E-W and N-S components of earth rate including Gyro bias can be measured simultaneously on orthogonal axes. The Gyro's bias (as calculated above) is removed from the measurement, leaving the actual Earth rate components on both axes.

The applied acceleration "g" acts uniformly on the Gyro rotor and spring mechanism which means the g-dependent bias is effectively cancelled out in the E-W and N-S axes.

After correcting for misalignments and scale factor errors on the 2 sensitive axes, the Azimuth of the axis "A" can be then calculated using the arctangent of the ratio of earth-rates $\Omega x$, $\Omega y$ measured on each axis.

Azimuth=Arctan $(\Omega x/\Omega y)$, (Assuming Axis A is not already pointing North, in which case a correction to this formula is required to avoid a divide by zero error).

The navigation device 16 further comprises a driving unit 9, including a first sub driving unit 22 configured to rotate the outer gimbal 1 about the outer gimbal axis A, a second sub driving unit 23 configured to rotate the middle gimbal 3a about the middle gimbal axis B and a third sub driving unit 24 configured to rotate the inner gimbal 3 about the inner gimbal axis D.

A processor 21 might be connected to the first, second and third sub driving units 22, 23, 24. In FIGS. 2, 3 and 5 the processor 21 and the first, second and third driving units 22, 23, 24 are depicted for visualization reasons outside of the outer, middle and inner gimbals 1, 3a, 3, however, it is to be understood that the processor 21 and the first, second and third driving units 22, 23, 24 might be realized as circuits and devices that are realized on the gimbals 1, 3a, 3 or might be connected by wire or wireless to some other part of the probe 15 or in a separate control station, e.g. on the top surface of the borehole 14.

The processor 21 is adapted to control the first, second and third driving units 22, 23, 24 so that the method as depicted in FIG. 4 can be realized.

In a step S400 the first sub driving unit 22 and the second sub driving unit 23 are driven so that the inner gimbal axis D is positioned or oriented in parallel to the direction of earth acceleration g. Generally the drilling is stopped during the first mode of operation in order to provide a stable situation for orienting the inner gimbal axis D in parallel to the direction of earth acceleration g. The position of the inner gimbal axis D versus the direction of earth acceleration g can be determined by using the at least two accelerometers 8 that are connected to the inner gimbal 3.

In the position of a parallel arrangement of the inner gimbal axis D and the direction of earth acceleration g the measurement results of the second gyro 4 are insensitive to gravity, which provides a possibility to determine gyro bias easily and rapidly, which can be used to initialize the bias of the second gyro 4. This makes the second gyro 4 insensitive to g-dependent bias, and hence only g independent biases need to be compensated.

Figure 6:
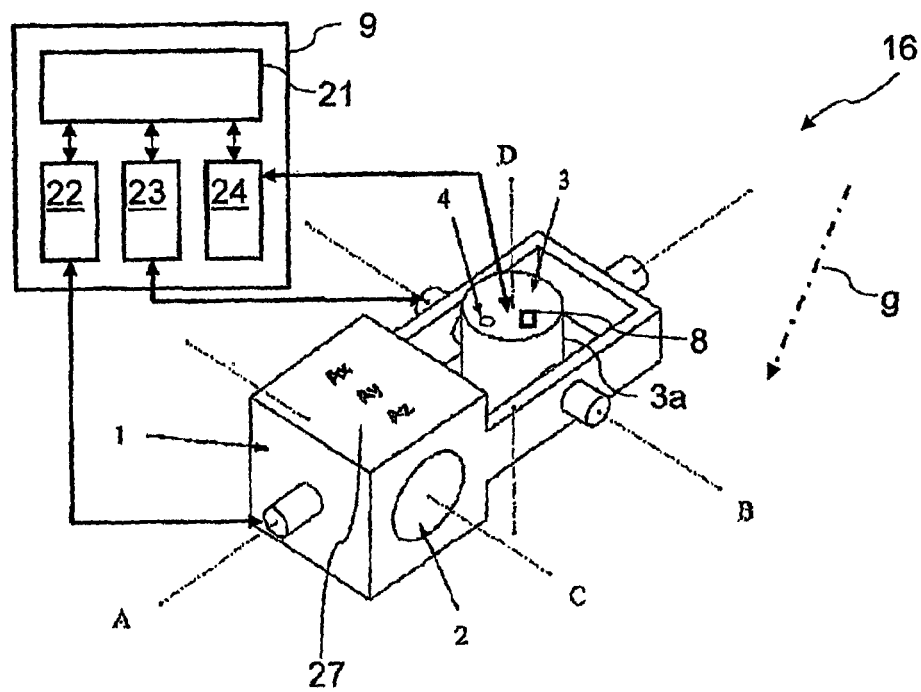
FIG. 6 is a schematic diagram of the navigation device according to a further preferred embodiment of the present invention in a second mode of operation.

The navigation device 16 in accordance with a preferred embodiment of the present invention provides the possibility to implement a second mode of operation, which is depicted in FIG. 6.

In the second mode of operation the inner gimbal axis D and—due to the connection of the second gyro 4 to the inner gimbal 3—the spin axis of the second gyro 4 is oriented perpendicular to the spin axis C of the first gyro 2, as is depicted in FIG. 6. In this position the first gyro 2 and the second gyro 4 are working as an inertial navigation system, which can determine position and attitude of the navigation device 16 while drilling with the drill bit 26 about the drill axis F. Additional measurement data might be obtained by three further acceleration sensors 27 that are connected to the inner gimbal 1 and which build a triad.

The second mode of operation might be used after the first mode of operation. While this position is kept, the attitude of the navigation device 16 is determined while drilling by using the measurement results of the first gyro 2, the second gyro 4, which build an inertial navigation system, and possibly by using additional measurement data from the further acceleration sensors 27 connected to the outer gimbal 1.

The navigation device 16 allows several modes of operation: surveying, orienting within a short time for orienting without previous calibration and surveying while drilling.

The invention solves this limitation of the "indexing" method, by allowing one of the two platform gyroscopes to be freely manipulated into a vertical position, which allows the earth's acceleration to always act in a known direction with respect to the two sensitive axes of the second gyroscope 4. In the case of a 2-axis dynamically tuned gyro (DTG), this is with the spin axis vertical. The probe 15 is brought into a stationary position, at any inclination or roll angle.

Then to make an accurate measurement of Azimuth, the spin axis of the second gyro 4 is brought into the vertical position (through motorized movement of roll and pitch axes) and local measurement of accelerometers 8. The bias is then nulled e.g. by making measurements opposing positions, and the earth rate in the two gyro axes (X and Y) is used to compute the Azimuth (angle around the vertical Z-axis of which the Gyro is aligned, i.e. the tool Azimuth).

This measurement can be made reliably at any angle of Inclination from Vertical (o degrees) to Horizontal (90 degrees) and any angle of roll. The measurement accuracy will not then be affected by either roll or inclination angles.

The calculated Azimuth is then stored e.g. in the downhole processor 21 of the probe. The second gyro 4 is then moved into the vertical position (orthogonal to the first gyro 2), and the system switches into "Inertial Navigation Mode" with the platform aligned to the calculated Azimuth.

This procedure can be repeated as the probe 15 progresses along the wellbore, with the condition that the probe 15 is stationary (drilling stopped, all movement stopped). This procedure will make sure that instrument errors which lead to an Azimuth error will be contained, and not grow unbounded.

The Downhole processor 21 processes the sensor data into the required output data for example (but not exclusively): Azimuth, Inclination, Toolface, HiSide, Measured Depth, and transmits these data via a suitable transfer medium such as (but not exclusively) a mud-pulse modem or E-Field communication device to the surface. In this way the drilling operator can monitor the position of the drillbit as it descends the wellbore, either during rotational or non-rotational drilling modes.

It should be appreciated that the scope of the invention is not limited to the scope of the embodiments described.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The invention claimed is:

1. A navigation device for surveying and directing a borehole, comprising:
   a first gyro including a first sensitive axis and a second sensitive axis;
   a second gyro including at least a third sensitive axis; and
   a driving unit configured to orient the second gyro in a first mode in a first position in which the third sensitive axis is orientated orthogonally to a direction of earth acceleration such that an earth acceleration dependent error on the second gyro is insignificant irrespective of any inclination or roll angle of the device, and to orient the second gyro in a second mode in a second position in which the third sensitive axis is perpendicular to the first sensitive axis and perpendicular to the second sensitive axis.

2. The navigation device according to claim 1, wherein the second gyro includes a spinning axis and the spinning axis in the first position is oriented in parallel to the direction of earth acceleration.

3. The navigation device according to claim 1, wherein the second gyro is realized as a multiple single-axis microelectromechanical system (MEMS) gyro.

4. The navigation device according to claim 1, further comprising:
   an outer gimbal including an outer gimbal axis;
   a middle gimbal connected to the outer gimbal, wherein the middle gimbal includes a middle gimbal axis perpendicular to the outer gimbal axis;
   an inner gimbal connected to the middle gimbal, wherein the inner gimbal includes an inner gimbal axis perpendicular to the middle gimbal axis;
   a first sub driving unit configured to rotate the outer gimbal about the outer gimbal axis;
   a second sub driving unit configured to rotate the middle gimbal about the middle gimbal axis;

a third sub driving unit configured to rotate the inner gimbal about the inner gimbal axis;

wherein the first gyro is connected to the outer gimbal and the second gyro is connected to the inner gimbal.

5. The navigation device according to claim 1, further comprising:

at least one acceleration sensor connected to the second gyro, wherein the at least one sensor is configured to determine the position of the second gyro in relation to the direction of earth acceleration.

6. The navigation device according to claim 5, wherein the at least one sensor includes three acceleration sensors which builds a triad.

7. The navigation device according to claim 6, further comprising:

three further acceleration sensors connected to the first gyro, which builds a triad.

8. The navigation device according to claim 1, wherein the earth acceleration dependent error on the second gyro is insignificant only when the second gyro in the first mode.

9. A drilling device, comprising:

a probe that is configured to rotate about a drill axis of the drilling device, the probe including a navigation device according claim 1.

10. A method for surveying and directing a borehole using a navigation device comprising a first gyro including a first sensitive axis and a second sensitive axis, and a second gyro including at least a third sensitive axis, the method comprising:

orienting the first gyro and the second gyro so that in a first mode the second gyro is in a first position in which the third sensitive axis is oriented orthogonally to a direction of earth acceleration such that an earth acceleration dependent error on the second gyro is insignificant irrespective of any inclination or roll angle of the device, and that in a second mode the second gyro is in a second position in which the third sensitive axis is oriented perpendicular to the first sensitive axis and the third sensitive axis is oriented perpendicular to the second sensitive axis.

11. A method according to claim 10, further comprising: determining in the first mode a bias of the second gyro that is independent of earth acceleration.

12. A method according to claim 10 further comprising: performing an inertial navigation in the second mode.

* * * * *